(12) United States Patent
Beard et al.

(10) Patent No.: US 11,016,503 B2
(45) Date of Patent: *May 25, 2021

(54) DYNAMIC STABILIZATION SYSTEM AND METHODS FOR AN RC VEHICLE

(71) Applicant: HORIZON HOBBY, LLC, Champaign, IL (US)

(72) Inventors: Paul Beard, Champaign, IL (US); Jukka Steenari, Champaign, IL (US); John Adams, Champaign, IL (US)

(73) Assignee: Horizon Hobby, LLC, Champaign, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/733,838

(22) Filed: Jan. 3, 2020

(65) Prior Publication Data
US 2020/0142416 A1    May 7, 2020

Related U.S. Application Data

(63) Continuation of application No. 15/137,938, filed on Apr. 25, 2016, now Pat. No. 10,528,060, which is a
(Continued)

(51) Int. Cl.
| | |
|---|---|
| *G05D 1/00* | (2006.01) |
| *G05D 1/02* | (2020.01) |
| *A63H 17/395* | (2006.01) |
| *A63H 17/36* | (2006.01) |
| *G01P 15/02* | (2013.01) |
| *A63H 30/04* | (2006.01) |

(52) U.S. Cl.
CPC ............. *G05D 1/028* (2013.01); *A63H 17/36* (2013.01); *A63H 17/395* (2013.01); *G01P 15/02* (2013.01); *G05D 1/0212* (2013.01); *A63H 30/04* (2013.01)

(58) Field of Classification Search
None
See application file for complete search history.

(56) References Cited

U.S. PATENT DOCUMENTS 7,610,131 B2 * 10/2009 Kojima ............ A63H 17/16
340/465
8,154,227 B1 * 4/2012 Young ............... A63H 30/04
318/255
(Continued)

*Primary Examiner* — Jonathan M Dager
(74) *Attorney, Agent, or Firm* — Baker Botts LLP

(57) ABSTRACT

Systems and methods for stabilizing the steering and throttle of a radio-controlled (RC) vehicle are described herein. More specifically, sensors and circuitry are configured to control the wheel speed and wheel direction of a RC vehicle based on rotational information. In operation, one or more sensors may be configured to receive angular rotational information associated with a rotation of the RC vehicle. The rotational information may define a rotation of the RC vehicle around one or more axes of the RC vehicle. The circuitry may be configured to receive the angular rotation information associated with the rotation of the RC vehicle from the one or more sensors, and control a wheel speed and/or a wheel direction of at least one wheel of the RC vehicle based at least in part on (i) command data received from a controller associated with the RC vehicle and (ii) the received angular rotation information.

20 Claims, 11 Drawing Sheets

Related U.S. Application Data continuation of application No. 14/292,307, filed on May 30, 2014, now Pat. No. 9,320,977.

(60) Provisional application No. 61/885,953, filed on Oct. 2, 2013.

(56) References Cited

U.S. PATENT DOCUMENTS

| | | | | |
|---|---|---|---|---|
| 8,160,816 | B2* | 4/2012 | Kanai | G01C 21/30 701/504 |
| 8,818,571 | B1* | 8/2014 | Iida | A63H 17/36 701/2 |
| 9,043,029 | B2* | 5/2015 | Seo | B62D 57/032 700/261 |
| 2003/0047362 | A1* | 3/2003 | Chernoff | B60T 1/065 180/65.245 |
| 2005/0222729 | A1 | 10/2005 | Sakata | |
| 2006/0052917 | A1* | 3/2006 | Schwarzhaupt | B60W 10/18 701/31.4 |
| 2006/0071551 | A1* | 4/2006 | Taniguchi | B60T 8/1755 303/146 |
| 2006/0085111 | A1 | 4/2006 | Kojima | |
| 2007/0035412 | A1* | 2/2007 | Dvorak | G08C 17/02 340/12.22 |
| 2008/0026671 | A1* | 1/2008 | Smith | A63H 17/36 446/456 |
| 2009/0076664 | A1* | 3/2009 | McCabe | G05D 1/0033 701/2 |
| 2009/0099735 | A1* | 4/2009 | McCoy | B60R 21/0134 701/46 |
| 2009/0222167 | A1* | 9/2009 | Goodwin | B62D 6/00 701/41 |
| 2009/0222168 | A1* | 9/2009 | Egenfeldt | B62D 5/0481 701/42 |
| 2011/0043515 | A1* | 2/2011 | Stathis | G06T 17/00 345/419 |
| 2011/0054717 | A1* | 3/2011 | Yamauchi | G05D 1/0038 701/2 |
| 2011/0066262 | A1* | 3/2011 | Kelly | G05B 23/0267 700/90 |
| 2011/0231050 | A1* | 9/2011 | Goulding | G05D 1/0891 701/26 |
| 2011/0234369 | A1* | 9/2011 | Cai | G06F 3/0346 340/4.31 |
| 2012/0041658 | A1* | 2/2012 | Turner | B60W 10/20 701/68 |
| 2012/0046856 | A1* | 2/2012 | Doi | B62K 11/007 701/124 |
| 2012/0130593 | A1* | 5/2012 | Davis | B62D 1/286 701/41 |
| 2012/0179322 | A1* | 7/2012 | Hennessy | G05D 1/0278 701/25 |
| 2012/0259479 | A1* | 10/2012 | Yoneta | G07C 5/08 701/1 |
| 2013/0006443 | A1* | 1/2013 | Woo | B61L 15/0027 701/2 |
| 2013/0226408 | A1* | 8/2013 | Fung | B62D 6/007 701/41 |
| 2013/0226409 | A1 | 8/2013 | Akiyama et al. | |
| 2013/0231814 | A1* | 9/2013 | Sarokhan | B62D 57/022 701/22 |
| 2014/0143839 | A1* | 5/2014 | Ricci | H04N 21/25816 726/4 |
| 2014/0312824 | A1* | 10/2014 | Beard | A63H 30/04 318/581 |
| 2014/0323013 | A1* | 10/2014 | Gonzalez-Heydrich | A61B 5/165 446/484 |
| 2015/0039350 | A1* | 2/2015 | Martin | G08G 1/09626 705/4 |
| 2015/0103019 | A1* | 4/2015 | Young | A45F 5/00 345/173 |
| 2015/0283703 | A1* | 10/2015 | Izhikevich | G05D 1/0246 706/11 |
| 2016/0185344 | A1* | 6/2016 | Moran | B60W 50/0097 701/41 |
| 2016/0303485 | A1* | 10/2016 | Kawamura | B62D 15/025 |

* cited by examiner

DYNAMIC STABILIZATION SYSTEM AND METHODS FOR AN RC VEHICLE

CROSS REFERENCE TO RELATED APPLICATIONS

This application is a continuation of U.S. application Ser. No. 15/137,938 filed Apr. 25, 2016, which is a continuation of U.S. application Ser. No. 14/292,307 filed May 30, 2014, now U.S. Pat. No. 9,320,977 issued Apr. 26, 2016, which claims priority under 35 U.S.C. § 119 to U.S. Provisional Application Ser. No. 61/885,953 filed on Oct. 2, 2013.

FIELD

The present disclosure relates to systems and methods for a radio-controlled (RC) surface vehicle. More specifically, disclosed embodiments relate to dynamic stabilization systems and methods that may affect the handling, response, and/or control of RC surface vehicles.

BACKGROUND

RC surface vehicles have been in operation for many years. In basic form, RC vehicles are self-powered model vehicles (e.g., cars, trucks, and boats) that can be controlled from a distance using a specialized transmitter (or controller). For example, a transmitter may be used to control the speed, forward and backward movement, and steering of an RC vehicle.

SUMMARY

When operating RC vehicles, it may be desirable to have a RC vehicle that is configured to electronically manipulate multiple controls of the RC vehicle including, for example, steering, throttle, braking, aerodynamic devices, manipulation of power and braking to each or a combination of wheels, ignition timing, etc. to enhance, degrade, or otherwise manipulate vehicle handling, response, and/or control.

The disclosed stabilization system and methods are designed to measure the angular rotation of a RC vehicle about various axes (e.g., a yaw axis) and provide steering and throttle control based on the measured angular control. For example, angular rotation information of a RC car may be measured about a yaw axis and a pitch axis of the RC car. Based in part on the angular rotation information, a wheel speed and wheel direction of the RC car may be controlled.

Some embodiments include methods for controlling the wheel speed of a radio-controlled (RC) vehicle. In a preferred embodiment, the method includes determining angular rotation information associated with a rotation of the RC vehicle about one or more axes of the RC vehicle. The preferred embodiment further includes controlling a wheel speed of at least one wheel of the RC vehicle based at least in part on (i) command data received from a controller associated with the RC vehicle and (ii) the determined angular rotation information.

Further embodiments include one or more sensors and control circuitry configured to control the wheel speed of a RC vehicle. In operation, the one or more sensors may be configured to receive angular rotational information associated with a rotation of the RC vehicle. The rotational information may define a rotation of the RC vehicle around one or more axes of the RC vehicle. The control circuitry may be configured to receive the angular rotation information associated with the rotation of the RC vehicle from the one or more sensors and control a wheel speed of at least one wheel of the RC vehicle based at least in part on (i) command data received from a controller associated with the RC vehicle and (ii) the received angular rotation information. In some embodiments, the control circuitry may be part of a receiver unit configured to receive control signals from a transmitter associated with the RC vehicle. In other embodiments, the control circuitry may be separate from receiver components.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
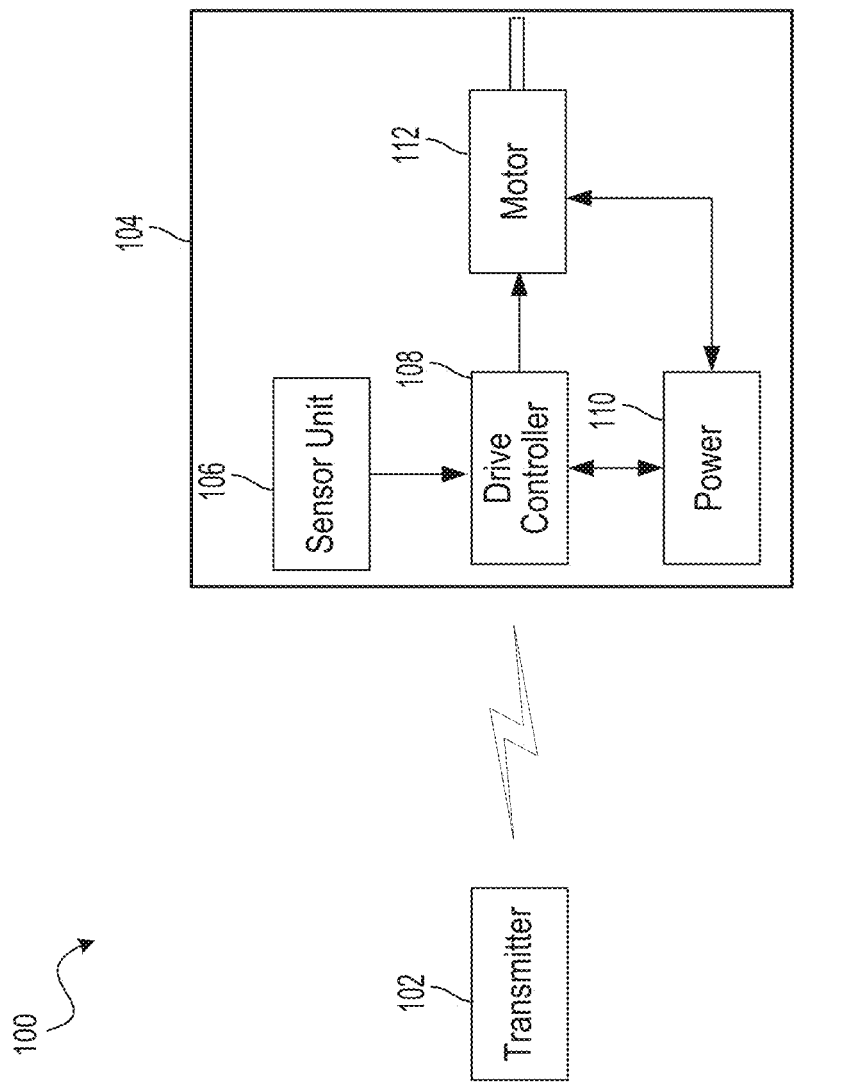
FIG. 1 illustrates a simplified block diagram of a radio-controlled (RC) vehicle system, according to an example embodiment.

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

RC vehicles such as a car, boat, truck, motorcycle, or plane have become quite developed and sophisticated over time. At times, the steering and handling characteristics of an RC surface vehicle may be difficult to control or unstable as users attempt to pursue and perform complex maneuvers and operations (e.g., perform an intentional spin out or wheelie). In an attempt to address such difficulty, manufacturers may apply certain design alterations or other configuration changes that may, in some instances, be implemented by the manufacturer or a user to alter handling characteristics of the RC vehicle.

For example, some manufacturers may alter the suspension design of an RC vehicle to change the handling characteristics of the RC vehicle. Such alterations may include manipulating roll centers, anti-squat angles, sweep angles, rising rates, toe-in angles, steering rates, etc. In other examples, transmitters and speed controllers may provide advanced features for changing the programming of throttle and steering response, include, e.g., adjustable response curves, steering rates, anti-lock braking, and throttle acceleration rates. These configurable features may allow the user to adjust the response of the vehicle and to allow for easier and greater control.

However, the handling and control systems and methods described above are generally non-dynamic systems. As a result, the systems' general settings may not be optimal under certain circumstances or conditions (e.g., one configuration may be better on dirt roads than on non-dirt roads), and for some conditions may even be very poor. Additionally, while the handling and control systems described above provide adjustability and customization, such systems may require the operator of the RC vehicle to possess a high level of knowledge and skill (and perhaps even specialized tools) to properly adjust the handling systems to the specific conditions (e.g., adjusting steering control based on traction associated with the surface upon which the RC vehicle will be travelling).

In embodiments of the disclosed invention, an RC vehicle is configured with a system employed to measure angular rotation and acceleration rates of the RC vehicle to actively manipulate one or more controls of the RC vehicle including, for example, steering, throttle, braking, wheelie angle, aerodynamic devices or any other device that may affect handling and control. In some embodiments, a RC vehicle according to some embodiments includes one or more sensors and a receiver (or drive controller or similarly-configured circuitry) that is used to control the wheel speed of the RC vehicle. In operation, the one or more sensors are configured to receive angular rotational information associated with the rotation of the RC vehicle. The rotational information may define a rotation of the RC vehicle around one or more axes of the RC vehicle. The receiver is configured to receive the angular rotation information associated with the rotation of the RC vehicle from the one or more sensors and, in turn, control a wheel speed of the RC vehicle based at least in part on (i) command data received from a controller associated with the RC vehicle and (ii) the received angular rotation information.

FIG. 1 illustrates a simplified block diagram of a radio-controlled (RC) vehicle system 100, according to an example embodiment. RC vehicle system 100 includes a transmitter 102 and a RC vehicle 104. RC vehicle 104 includes sensor unit 106, drive controller 108, power source 110, and motor 112.

Transmitter 102 is configured to transmit radio-control signals to RC vehicle 104 for controlling the steering, braking, speed, etc. of RC vehicle 104. Accordingly, transmitter 102 includes circuitry (not shown) for generating the radio-control signal and sending the radio-control signal over a frequency to the drive controller 108 of RC vehicle 104. Such radio-control signals may include signals that instruct RC vehicle 104 to move forward and backward or to turn left or right. Other instructions may be provided as well. Transmitter 102 may take the form of a single-function controller or a full-function controller that includes a wide range of options.

Sensor unit 106 generally includes one or more sensors configured to detect information about the environment surrounding the RC vehicle 104. For example, the sensor unit 106 may include one or more of a Global Positioning System (GPS), an inertial measurement unit (IMU), and/or a camera. Sensor system 104 may also include sensors configured to monitor internal systems of the RC car and measurements (e.g., pitch, yaw, and roll angles) of the vehicle 104 (e.g., wheel speed sensors, wheel direction sensors, etc.). In some embodiments, sensor unit 106 may also include one or more gyroscopes or accelerometers, each configured to determine (or measure) rotational information about various axes of RC vehicle 104. Additionally, in some embodiments, one or more of the sensors included in the sensor unit 106 may be utilized or activated separately and/or collectively to modify a position and/or an orientation of the RC vehicle 104. For example, in an embodiment, a user of an RC vehicle may require yaw-only control, such as when an RC vehicle is being used on a flat track, thus, only two sensors of the sensor unit 106 are utilized (i.e., a yaw-axis gyroscope and accelerometer). As a result, the sensor unit 106 can be used in multiple applications by activating, actuating, and/or utilizing the sensors separately and/or collectively.

In a further embodiment, application specific sensor units may be employed. For example, if a user knows a particular application will be required (e.g., yaw-only control), the user may purchase an application specific sensor unit that uses a smaller amount of sensors, thereby reducing material costs.

Drive controller 108 is configured to control the steering and throttle of the RC vehicle. In some embodiments, drive controller 108 may also incorporate a receiver that receives radio-control signals from transmitter 102. In such embodiments, the drive controller 108 transmits the radio-control signal to motor 112 in the form of a suitable electrical control signal. For example, when a signal instructing the RC vehicle to move forward is transmitted by transmitter 102 and received by drive controller 108, drive controller 108 in turn transmits a suitable command(s) to motor 112 to cause the RC vehicle 104 to move forward.

Further, drive controller 108 may be operatively connected to one or more electronic speed controllers (ESC) and/or servomechanisms (servos) (not shown) which may perform actions such as throttle control, braking, steering, and on some RC vehicles, engaging either forward or reverse gears. The ESC and/or servos may be commanded by drive controller 108 using pulse width modulation, where pulse duration sets either the amount of current that an electronic speed control allows to flow into the electric motor or sets the angle of the servo. In some embodiments, the drive controller and the ESC may be integrated into one controller. In yet further embodiments, the drive controller 108, an ESC, and sensor unit 106 may be integrated in one controller, and integrated in a manner such the integrated unit is smaller and lighter than the combination of separate single-purpose components.

Power source 110 provides power to components of the RC vehicle 104, such as to the drive controller 108 and the sensor unit 106. In some embodiments, power source 108 includes a rechargeable lithium polymer, lithium-ion, nickel-metal hydride or lead-acid battery for storing and discharging electrical energy to the various powered components, for example. In some embodiments, one or more banks of batteries may be configured to provide electrical power.

Motor 110 may be any type of motor for powering RC vehicle 104, and may depend on the type or model of RC vehicle. For example, electric model RC vehicles include electric motors powered by rechargeable lithium polymer, lithium-ion, nickel-metal hydride, or lithium polymer cells. The electric motor may be a brushed or brushless electric motor. Fuel-powered RC vehicles may use glow plug engines, small internal combustion engines fuelled by a special mixture of nitro methane, methanol, and oil. Some RC vehicles may be powered by small gasoline engines, similar to string trimmer motors, which use a mix of oil and gasoline. In other embodiments, RC vehicle 104 may include multiple types of engines and/or motors. Other examples are possible as well.

Figure 2:
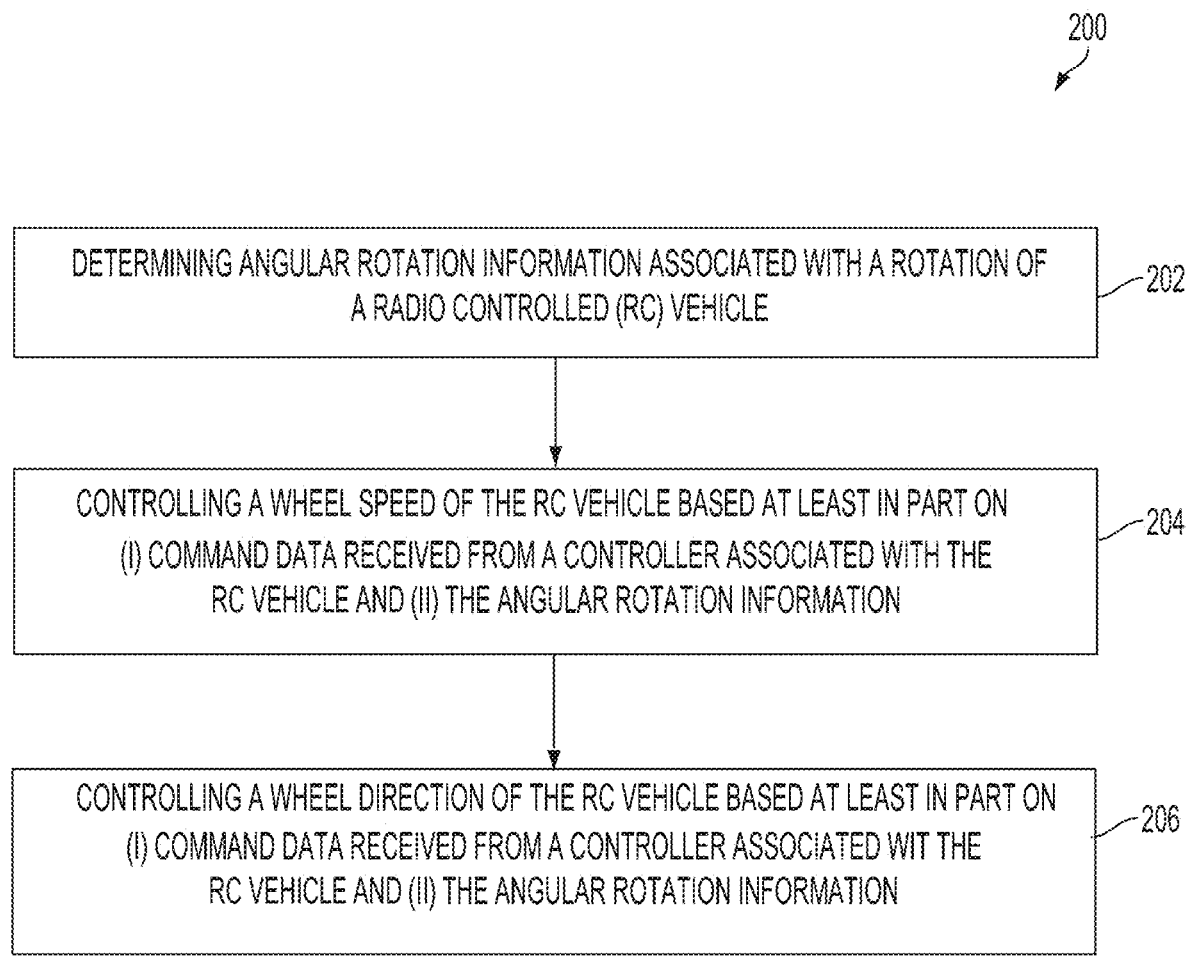
FIG. 2 illustrates an algorithm that may be carried out by the RC vehicle of FIG. 1, according to an example embodiment.

FIG. 2 illustrates an algorithm 200 that may be carried out by RC vehicle 100 described in reference to FIG. 1. More specifically, algorithm 200 may be carried out by drive controller 108 along with sensor unit 106, for example.

Algorithm 200 begins at logic block 202, which includes determining angular rotation information associated with a rotation of a RC vehicle. The angular rotation information may be any angular rotational information indicative of a rotation of RC vehicle 104. For example, the angular rotation information may include information that defines the rotation of RC vehicle 104 about one or more axes including roll angle and rate (acceleration and deceleration), pitch angle and rate, and yaw angle and rate. Other rotational information may be included as well, for example, angular rotation of one or more wheels may be included. The angular rotation information may be determined, for example, using sensor unit 106. For instance, RC vehicle 104 may utilize a gyroscope and/or an accelerometer to measure the yaw angle and yaw rate as RC vehicle 104 moves about its yaw axis.

Once the angular rotation information has been determined, at block 204, algorithm 200 includes controlling a wheel speed of the RC vehicle based at least in part on (i) command data received from a controller associated with the RC vehicle and (ii) the angular rotation information determined above at logic block 202. The command data is typically received from a transmitter such as transmitter 102, and may take the form of the radio-control signals described in regard to FIG. 1, and may be utilized with the angular rotation information to provide a desired handling or control of RC vehicle 104.

In some embodiments, controlling the wheel speed may include determining whether a yaw rate exceeds a yaw rate threshold based on the determined angular rotation information. And in response to determining that the yaw rate exceeds the yaw rate threshold, determining the amount by which the yaw rate exceeds the yaw rate threshold, and reducing the wheel speed. In some embodiments, the wheel speed may be reduced by an amount related to the amount by which the determined yaw rate exceeds the yaw rate threshold. In some embodiments, the wheel speed may be reduced by an amount approximately proportional to the amount by which the determined yaw rate exceeds the yaw rate threshold.

Figure 3:
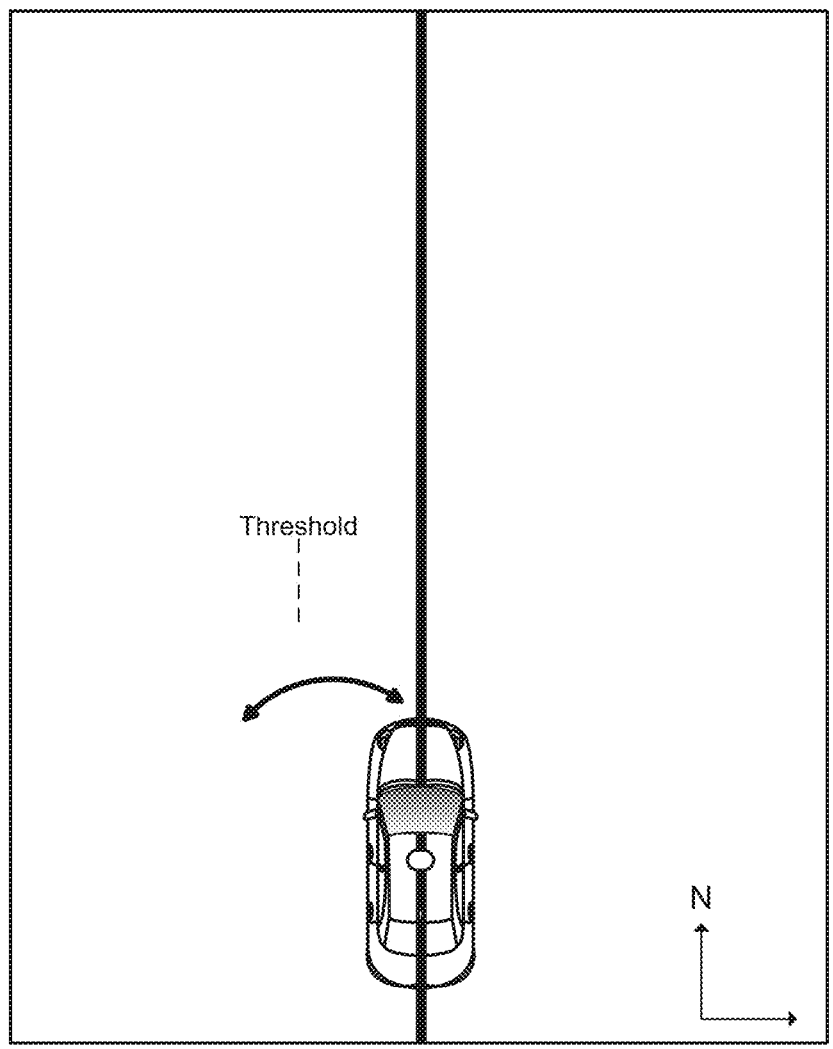
FIG. 3 illustrates an operating scenario, according to an example embodiment

For example, in scenario 300 shown in FIG. 3, an RC vehicle 302 receives command data for operating RC vehicle 302. The command data may, for example, control RC vehicle 302 to proceed in a straight north heading (shown as the solid black line in FIG. 3) at a certain speed.

As RC vehicle 302 continues along its current heading, it may receive new command data instructing RC vehicle 302 to begin to turn left.

While beginning to turn left, an IMU, gyroscope, and/or accelerometer is used to measure the rotation of RC vehicle 300 about one or more of its pitch, roll, and/or yaw axes. Using the pitch, roll, and/or yaw measurements, RC vehicle 302 controls the wheel speed of one or more its wheels. For example, in the scenario depicted in FIG. 3, the sensors (e.g., accelerometer(s), gyroscope(s), and/or IMU(s)) may determine that RC vehicle 302 has a yaw rate larger than a yaw rate threshold (not shown). In other words, RC vehicle 302 may determine the rate at which the RC vehicle 302 is rotating around its yaw axis is faster than desired. In response, RC vehicle 302 may reduce the wheel speed (e.g., by reducing the throttle) of one or more of its wheels to reduce the yaw rate of the RC vehicle 302. In operation, the reduction in wheel speed may be proportional to (or otherwise related to) the amount by which the measured yaw rate (and/or yaw) exceeds the yaw rate threshold (and/or yaw threshold). Such proportional wheel speed reduction may be accomplished by reducing the power applied to a wheel (or wheels) by an amount proportional (or otherwise related to) the amount by which the measured yaw and/or yaw rate exceeds its corresponding threshold. However, the wheel speed may be reduced by other related amounts as well. For example, power to the wheel may be temporarily suspended and/or braking may be temporarily applied to a particular wheel (or wheels) until the measured yaw (and/or yaw rate) falls below the corresponding yaw (and/or yaw rate) threshold.

Referring back to FIG. 2, in other embodiments, instead of or in addition to controlling the wheel speed based on yaw or yaw rate thresholds, RC vehicle 104 may additionally or alternatively control wheel speed by based on roll and/or roll rate thresholds. For example, RC vehicle 104 may reduce the wheel speed of one or more wheels in response to determining that the roll rate (and/or roll) exceeds a corresponding roll rate (and/or roll) threshold. The reduction in wheel speed may be proportional to (or otherwise related to) the amount by which the measured roll (and/or roll rate) exceeds the corresponding roll (and/or rate) threshold. Likewise, in some embodiments, wheel speed may be reduced by temporarily suspending power to the wheel (or wheels) and/or temporarily applying braking to a particular wheel (or wheels) until the measured roll (and/or roll rate) falls below the corresponding roll (and/or roll rate) threshold.

In some examples, algorithm 200 ends at block 204. However, in some embodiments, as shown in FIG. 2, algorithm 200 may continue to logic block 206 that includes controlling a wheel direction of the RC vehicle based at least in part on (i) command data received from a controller associated with the RC vehicle and (ii) the angular rotation information. In other words, at logic block 206 the RC vehicle may control a wheel direction instead of or in addition to the wheel speed controlled at block 204, noted above.

For example, and returning to scenario 300 of FIG. 3, RC vehicle 302 uses the drive controller and sensors (e.g., gyroscope(s), accelerometer(s), and/or IMU(s)) to determine whether the RC vehicle 302 has a yaw angle 306 that is larger than the yaw angle threshold 304. In response, RC vehicle 302 then: (1) determines both (a) an amount by which the yaw angle exceeds the corresponding yaw angle threshold and (b) a direction of the yaw angle; and (2) steers the vehicle in the opposite direction of the yaw angle by an amount proportional to (or otherwise related to) the amount by which the yaw angle exceeds the yaw angle threshold. Accordingly, in scenario 300 of FIG. 3, RC vehicle 302 may be controlled to steer right (east) in opposition to the yaw angle 306.

Similarly, in some embodiments (not shown in FIG. 3), RC vehicle 302 may determine whether a roll angle exceeds a roll angle threshold based on the measured roll angle. In response to determining that the roll angle exceeds the roll angle threshold, the RC vehicle then: (1) determine both (a) an amount by which the roll angle exceeds the roll angle threshold and (b) a direction of the roll angle; and (2) steer the RC vehicle in the opposite direction of the roll angle by an amount proportional to (or otherwise related to) the amount by which the roll angle exceeds the roll angle threshold.

Similar to controlling the wheel speed, the wheel direction may be controlled by an amount approximately proportional to the amount by which the measurement (e.g., yaw angle or roll angle) exceeds the measurement threshold. Additionally, in some embodiments, the rate at which the RC vehicle 302 steers right or left may be based on the measured yaw rate and/or roll rate. For example, the RC vehicle 302 may slowly steer the wheels in opposition to the yaw angle 306 when the yaw rate (i.e., the rate of change of the yaw over time) is slow so as to cause the RC vehicle 302 to gracefully recover from slowly passing through the yaw rate threshold. Similarly, the RC vehicle 302 may quickly steer the wheels in opposition to the yaw angle 306 when the yaw rate is fast so as to swiftly recover from quickly passing through the yaw rate threshold. In some embodiments, the rate at which the RC vehicle 302 steers right or left in response to the yaw angle threshold crossing may additionally or alternatively be based on the forward speed of the RC vehicle (as measured by the accelerometer(s) and/or IMU (s)), e.g., the steering rate may be inversely proportional to the forward speed. For example, the RC vehicle 302 may slowly steer the wheels in opposition to the yaw angle when the RC vehicle is traveling a slower rate of speed, but quickly steer the wheels in opposition to the yaw angle when the RC vehicle is traveling at a higher rate of speed.

Figure 4:
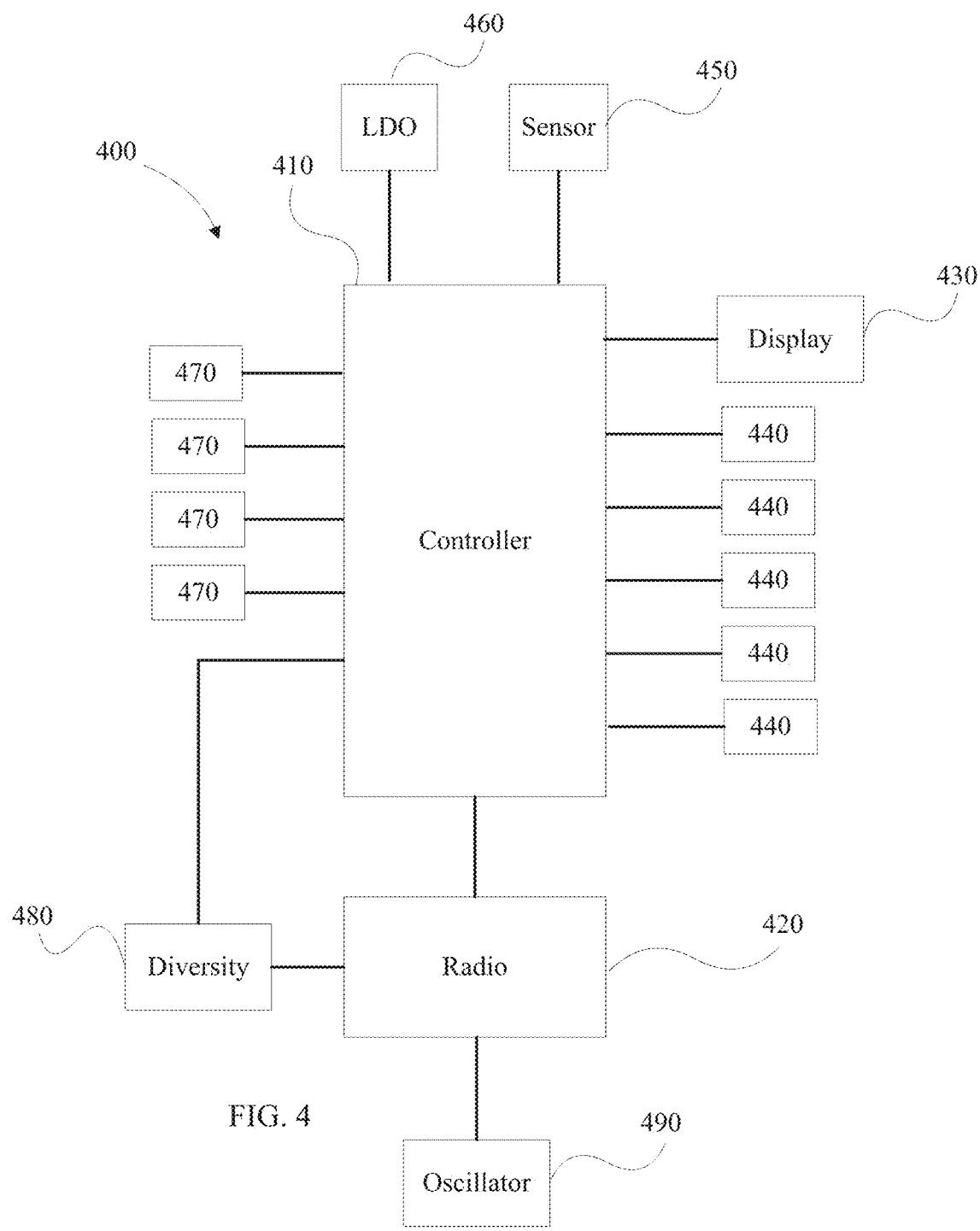
FIG. 4 illustrates a block diagram of circuitry configured to perform the methods describe herein, according to an example embodiment.

FIG. 4 illustrates a block diagram of one example embodiment of circuitry configured to perform the methods described herein. Reference numeral 400 generally indicates a block diagram showing an example of hardware architecture. In this example, the controller 410 is electrically connected to a radio 420, a display 430, a first set of one or more input/output ("I/O") ports 440, one or more sensors 450, a second set of one or more I/O ports 470, and a diversity block 480. The controller is operatively connected to a low-dropout regulator 460. The radio 420 is connected to an electric oscillator 490.

In operation, a controller 410 carries out the instructions of a computer program by performing the basic arithmetical, logical, and input/output operations of the system. An example of a controller is a microcontroller that is a single integrated circuit containing a processor core, memory and programmable inputs and outputs. The controller 410 may also contain program memory on the circuit. The controller is electrically connected to the radio 420, or in some embodiments may include the radio. An example radio 420 is a low power radio transceiver such as a 2.4 gigahertz (GHz), low power, direct sequence spread spectrum radio transceiver. However, other radios suitable for transmitting and receiving control data for RC vehicles could be used as well.

The display 430 may be one or more light-emitting diodes ("LED") or other suitable component for displaying current operational information of the system. Other example displays, such as liquid crystal displays ("LCD") and organic light-emitting diodes ("OLED") displays, may be used as well.

The first set of I/O ports 440 may be used as communication ports with various modes of communication. For example, a port may be configured to operate using pulse-position modulation (PPM), which is a form of digital signal modulation in which M message bits are encoded by transmitting a single pulse of $2^M$ time-shifts. This is repeated every T seconds, such that the transmitted bit rate is M divided by T bits per second. A port may be configured to operate in serial communication by sending data one bit at a time, sequentially. A port may be configured to operate in parallel communication by conveying multiple bits simultaneously. A port may be configured to operate under various modes, such as both PPM and serial. Different ports may be configured to operate in different modes, depending on the configuration. Other modes of communication may be utilized as well.

The controller is also electrically connected to one or more sensors 450. Various sensors 450 may be used. For instance, the controller 410 may be connected to sensors 450 such as one or more accelerometers to measure acceleration and deceleration along one or more corresponding axes, one or more gyroscopes to measure an angular rotation along one or more corresponding axes, one or more optical sensors to measure changes in the presence of ambient light, a global-positioning system for navigational measurements, and/or any other type of sensor suitable for use with an RC vehicle.

The controller 410 may be operatively connected to a low-dropout regulator 460. A low-dropout regulator 460 is a direct current linear voltage regulator which can operate with a very small input-output differential voltage. Advantages to a low-dropout regulator 460 include lower minimum operating voltage, higher efficiency operation, and lower heat dissipation. The controller 410 may utilize the low-dropout regulator 460 to determine when a voltage level has dropped below an operational threshold for the radio 420. For example, a radio 420 may require a voltage of 3.2 volts to operate, while a low-dropout regulator 460 may require a voltage of only 1 volt to operate. The controller 410 may determine when the voltage is below 3.2 volts based on the operation of the low-dropout regulator 460 and indicate the low voltage status on the display 430, for example, by lighting an LED.

The controller 410 may be electrically connected to a second set of I/O ports 470. In an example embodiment, the microcontroller may use the second set of I/O ports 470 for telemetry and programming functions. For example, one port may be used as a binding port to bind, or pair, the radio 420 with a matching radio (not shown). Other ports may be used for purposes of telemetry, in other words, as an automated communications process by which measurements are made and other operational data relating to the control and operation of the RC vehicle are collected and transmitted to receiving equipment. Some examples of telemetry include voltage measurements, temperature measurements, and revolution per time measurements. Another example of telemetry is quality of service, referring to several aspects of a communication system, including but not limited to response time, loss, signal-to-noise ratio, cross-talk, echo, interrupts, frequency response, and/or loudness levels.

The controller 420 may use a diversity scheme 480 in connection with the radio 420 to improve the reliability of a message signal. The diversity scheme may use two or more communication channels with different characteristics. Because individual channels experience different levels of fading and interference, multiple versions of the same signal may be transmitted and/or received and combined in the radio 420. Various types of diversity schemes 480 may be used such as time diversity, frequency diversity, spread spectrum diversity, space diversity, polarization diversity, or multiuser diversity, among others.

Figure 5:
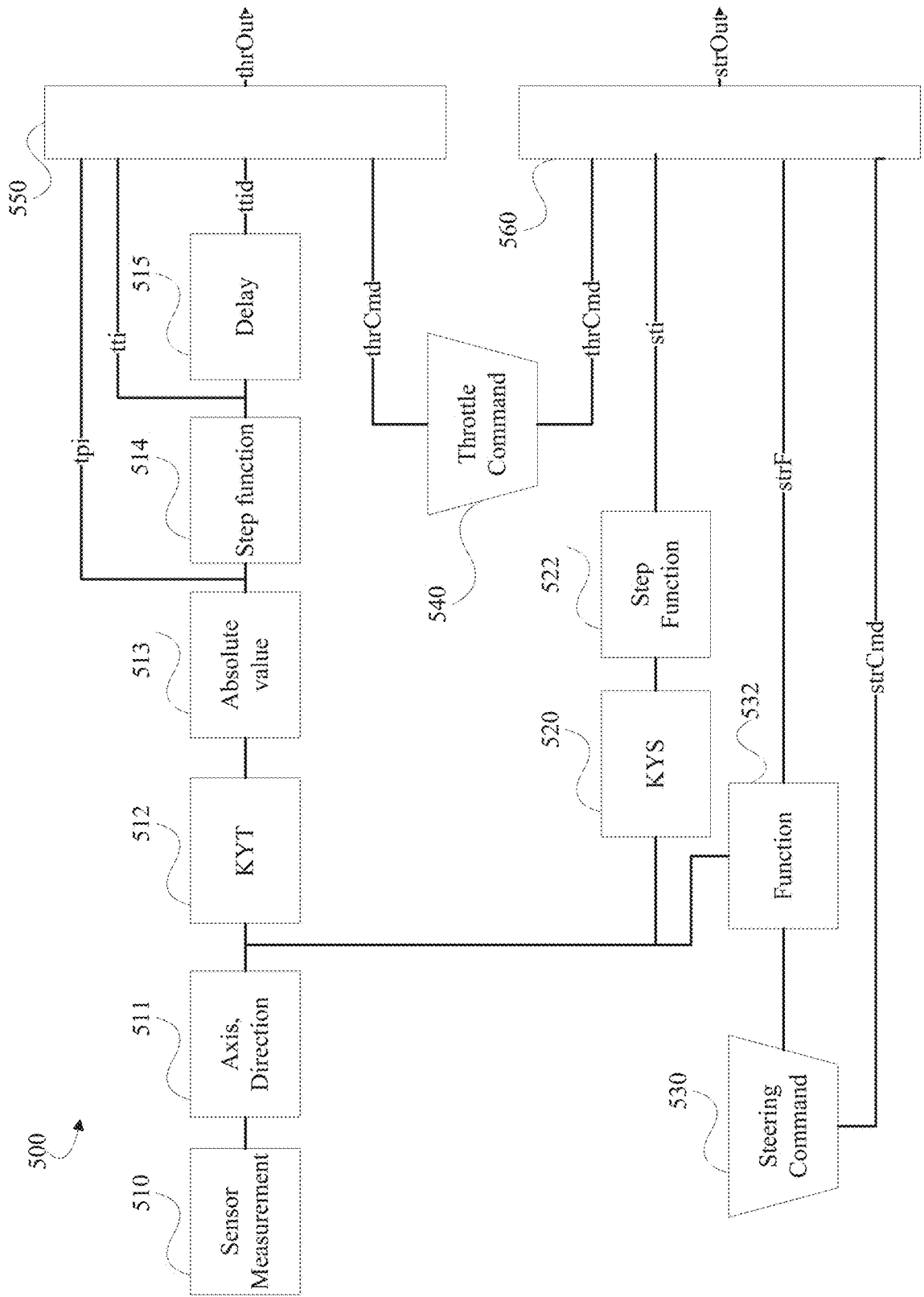
FIG. 5 illustrates a method of selecting throttle and steering outputs.

FIG. 5 illustrates a method 500 of selecting throttle and steering outputs. At block 510, a sensor measurement is received. In an example embodiment, the sensor may be a yaw rate sensor (or rotational speed sensor) used to measure a vehicle's angular velocity about its vertical axis in degrees or radians per second in order to determine the orientation of the vehicle as it maneuvers. Sensors such as gyroscopes, accelerometers, inertial measurement units, optical sensors, and others may be used as well to measure or otherwise determine one or more of a roll angle, roll rate, pitch angle, pitch rate, yaw angle, yaw rate, and/or position relative to ground, etc. of an RC vehicle, as described herein.

At block 511, the axis and direction are determined. In an example embodiment, the axis and direction may be determined from the sensor measurements, from other sensors, from other circuitry, or from another source such as a user command. For example, a yaw axis may be determined with an inertial measurement unit because the yaw axis will be the only axis without a static force equivalent to Earth's gravitational force, or one-g.

At block 512, the sensor measurement is multiplied by a constant KYT. In an example embodiment, KYT is equal to a throttle gain subtracted from the sensor measurement.

At block 513, the absolute value of the resulting product from block 512 is calculated. In an example embodiment, the result of block 513, titled "tpi" for "throttle proportional intervention," is provided to block 550 as one of four inputs. An example of throttle proportional intervention is a throttle intervention that is proportional to the absolute yaw rate.

At block 514, the result of block 513 is multiplied by a step function. In an example embodiment, the step function may be a unit step function, or Heaviside step function, H(x), with a programmable threshold, such that:

$$H(x) = \begin{cases} 1 & x < \text{threshold} \\ 0 & x \geq \text{threshold} \end{cases}$$

In an example embodiment, the result of block 514, titled "tti" for "throttle threshold intervention," is provided to block 550 as one of four inputs. The throttle threshold intervention may be a full intervention in response to a sensor measurement above or below a programmable threshold.

At block 515, the result of block 514 is delayed. In an example embodiment, the result of block 515, titled "ttid" for "throttle threshold intervention delayed," is provided to block 550 as one of four inputs. The throttle threshold intervention delayed may be a programmable delay of a full intervention in response to a sensor measurement above or below a programmable threshold. For example, a programmable exponential decay function may be used at block 515 to delay the throttle threshold intervention for some time.

At block 520, the sensor measurement is multiplied by a constant Kys. In an example embodiment, KYS may be determined by subtracting a steering gain from the sensor measurement.

At block 522, the result of block 520 is multiplied by a step function. In an example embodiment, the step function is a piecewise function P(x) with a programmable threshold, such that:

$$P(x) = \begin{cases} 1 & x > \text{threshold} \\ 0 & -\text{threshold} < x < \text{threshold} \\ -1 & x < -\text{threshold} \end{cases}$$

In an example embodiment, the result of block 522, titled "sti" for steering threshold intervention, is used at block 560 as one of four inputs.

At block 530, a steering command is received. In an example embodiment, the steering command may be received from a transmitter associated with the RC vehicle when a user deflects the steering position of a control, or wheel, on the transmitter. The steering command may also be used at block 560 as one of four inputs.

At block 532, the steering command, rate gain, and heading gain, are used as inputs to a function. For example, the steering command, rate gain, and heading gain may be used in combination with measurements from an inertial measurement unit to determine a steering threshold intervention. Thus, the steering threshold intervention may be a signed, full intervention in response to a sensor measurement above or below a programmable threshold. In a further aspect, the steering command, rate gain, and heading gain may be used as inputs to facilitate a heading region mode, such as the heading region mode described with reference to FIG. 7. The result of block 532, "strF," is used at block 560 as one of four inputs.

At block 540, a throttle command is received ("thrCmd"). In an example embodiment, the throttle command may be received from a transmitter associated with the RC vehicle when a user deflects the throttle position of a control, or trigger, on the transmitter. In an example embodiment, the throttle command may be used at block 550 as one of four inputs and at block 560 as one of four inputs.

At block 550, one of the four inputs, or a combination of one or more of the four outputs, may be selected as the throttle output ("thrOut") based on pre-programmed selection criteria. Alternatively, the throttle command may be selected by a user, for example, by flipping a switch on a transmitter or controller. The thrCmd throttle output may be selected when no throttle control is required or desired. The tpi throttle output may be selected when a proportional throttle control is required or desired. For example, a proportional throttle control may be used where stabilized throttle control is desired to be engaged and proportionally responsive to thrCmd. The tti throttle output may be selected when a threshold throttle control is required or desired. For example, a threshold throttle control may be used where stabilized throttle control is desired to be engaged only after a certain threshold has been hit. The ttid throttle output may be selected when a delayed threshold throttle control is required or desired. A delayed threshold throttle control may be used where stabilized throttle control is desired to be engaged after a certain threshold has been hit and a certain amount of time has passed. A combination of the throttle outputs may be selected as well, for example, an average (including a weighted average) of thrCmd and tpi throttle outputs may be used for an intermediate level of throttle intervention as compared to the full tpi throttle intervention.

At block 560, one of the four inputs, or a combination of one or more of the four outputs, is selected as the steering output ("strOut") based on pre-programmed selection criteria. Alternatively, the steering command may be selected by a user, for example, by flipping a switch on a transmitter or controller. The strCmd steering output may be selected when no steering stabilization is required or desired. The thrCmd steering output may be selected when a throttle-related steering stabilization is desired. For example, a throttle-related steering stabilization may increase the application of the stabilization function when the throttle is higher to aid in improving the steering stability at higher speeds, but decrease the application of the stabilization function when the throttle is low to allow for finer steering control at lower speeds. The sti steering output may be selected when a threshold steering stabilization response is desired. For example, a threshold steering stabilization response may be used where stabilized steering is desired to be engaged only after a certain threshold (e.g., throttle, speed, steering position, etc.) has been hit. The strF steering output may be selected when a programmable steering stabilization response is desired. For example, a programmable threshold stabilization response may be desired where a user wishes to operate an RC vehicle in a heading hold mode, or heading region (as described below in reference to FIG. 7). A combination of the steering outputs may be selected as well, for example, an average (including a weighted average) of strCmd and sti steering outputs may be used for an intermediate level of steering intervention as compared to the full tpi throttle intervention.

The gains (e.g., steering, throttle, rate, heading gains, etc.) described above may be programmable and modifiable. For example, an auxiliary channel on a transmitter may be used to increase or decrease a particular gain. The thresholds (e.g., yaw angle, yaw rate, roll angle, roll rate, pitch angle, pitch rate thresholds, etc.) described above may also be programmable and modifiable. For example, the threshold defined in equation H(x) may be programmable (e.g., through a computer, mobile electronic device such as a cell phone, or other computing device) or modifiable by turning a knob on a transmitter. In a further aspect, more than one threshold may be used. For example, a high threshold and a low threshold for the pitch, roll, and yaw thresholds may be used as well. For example, with reference to FIG. 3, an additional threshold 304B (not shown) may be used in combination with threshold 304A to provide additional stabilization response capabilities. In this example, 304B may be a higher threshold than threshold 304A. As sensor measurements approach the lower threshold 304A, a lower stabilization response is utilized (i.e., less steering and throttle correction are needed, so smaller adjustments are made). However, as sensor measurements approach threshold 304 B, a higher stabilization response is utilized.

In an example embodiment, the microcontroller 410 may have a throttle ramp algorithm that limits the rate of change of throttle response to a throttle command. To improve the throttle intervention, the throttle ramp algorithm may be turned off or otherwise disabled or deactivated.

Figure 6:
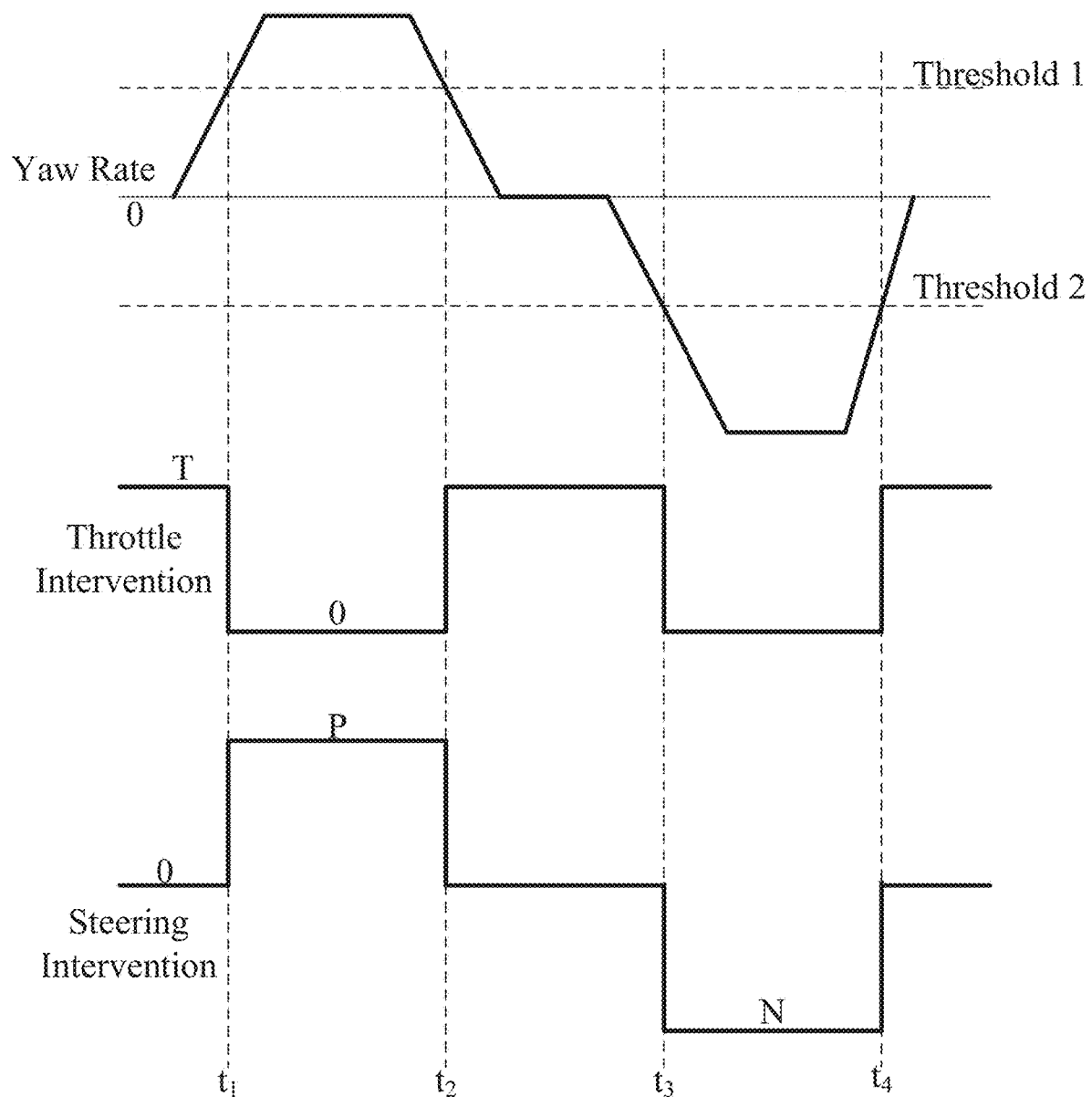
FIG. 6 illustrates an example embodiment of throttle and steering responses to a sensor measurement.

FIG. 6 illustrates an example of throttle and steering responses to sensor measurements. In the example of FIG. 6, the sensor is a yaw rate sensor. Threshold 1 and Threshold 2 may be programmable thresholds, for example, 15 degrees per second and −20 degrees per second, respectively.

Between times $t_1$ and $t_2$, FIG. 6 illustrates a yaw rate value above the programmable threshold, Threshold 1. Between times $t_3$ and $t_4$, FIG. 6 illustrates a yaw rate value below the programmable threshold, Threshold 2. In operation, the throttle value is changed in response to the sensor measurement going above or below the yaw threshold. For example, the throttle value is reduced from value T down to a value of 0 during the time that the sensor measurement is above Threshold 1. Likewise, the throttle value is increased from 0 to T once the sensor measurement falls below Threshold 1. But the throttle value is again decreased from T down to a value of 0 during the time that the sensor measurement is below Threshold 2. Value T may be a programmable value or a preset value, for example, T may equal a preset value of 1 that corresponds to 100% throttle intervention.

In response to the sensor measurement going above or below the thresholds, the steering value may also be changed. For example, the steering value may be a positive value P when the sensor measurement is above Threshold 1 and may be a negative value N when the sensor measurement is below Threshold 2. For example, P may be equal to a programmable value or a preset value such as a preset value of 1 that corresponds to 100% steering intervention based on the maximum amount of travel in a first direction of a servomotor that controls steering. Likewise, N may be equal to a programmable value or a preset value such as a preset value of −1 that corresponds to 100% steering intervention based on the maximum amount of travel in an opposite direction of the first direction of the servomotor that controls steering.

Figure 7:
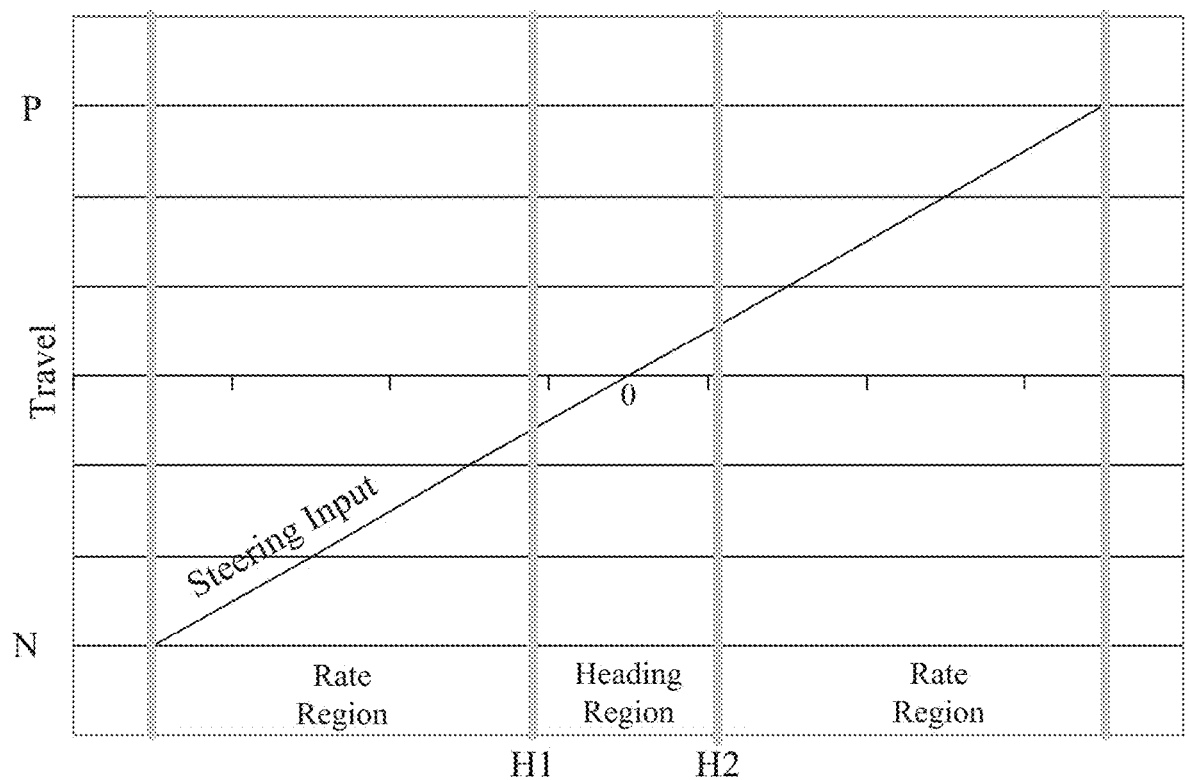
FIG. 7 illustrates a heading mode, according to an example embodiment.

FIG. 7 illustrates a heading mode, according to an example embodiment. An RC vehicle has a set steering travel, or steering capability to turn its wheels, for example, a maximum amount P in a first direction and a maximum amount N in the opposite direction of the first direction. A user may wish for a vehicle to maintain a current heading without having to input steering commands. FIG. 7 illustrates a Heading Region, between H1 and H2, where a mode of operation may be utilized to maintain a heading. For example, if a user returns the steering wheel on the transmitter to between H1 and H2 (e.g., the steering wheel returns to a near-center position), the heading mode is activated. In an example, the heading mode is utilized as a steering output, such as strF, when heading mode is enabled.

A heading mode may be enabled through pre-programming or by a user (e.g., by flipping a switch). For example, if the heading mode is enabled and the steering wheel is between H1 and H2, the steering output is selected as strF. The steering output, strF, for example, may store a known heading value when the steering wheel returns to between H1 and H2, find a heading difference value by comparing the stored known heading to an IMU output value based on variances in heading (e.g., such as variances in a yaw sensor measurement), and provide a steering correction value. The steering correction value may be related to the heading difference value in different ways. For example, the steering correction value may be linear and substantially equal and opposite to the heading difference value to correct a variance. In a further embodiment, the steering correction value may be related to the heading difference value in other ways, such as a weighted average relationship or an exponential relationship.

Figure 8:
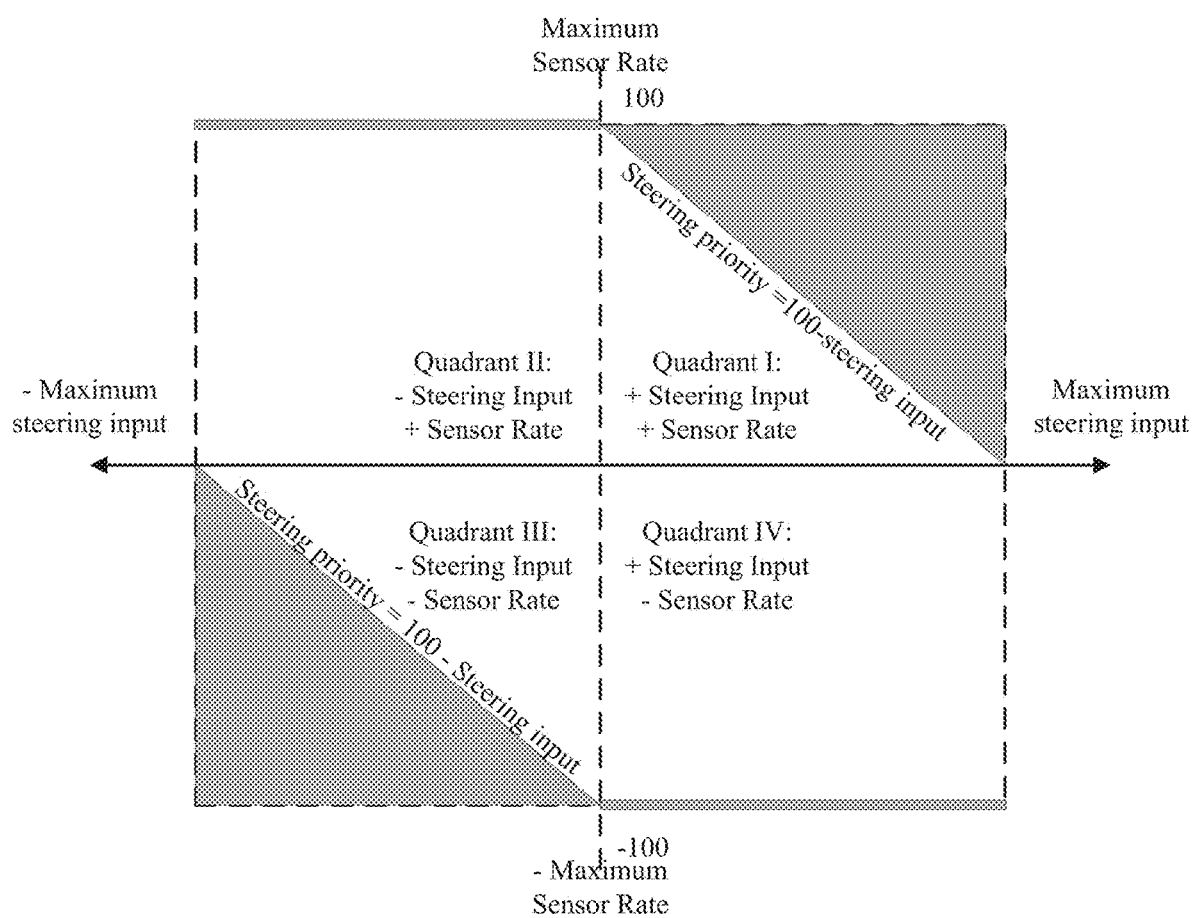
FIG. 8 illustrates a varying steering priority gain that varies based on a steering input and a yaw rate received from the yaw rate sensor.

Alternatively, when the steering input is displaced a distance from center (e.g., the steering wheel is displaced more than H1 in one direction or H2 in the other direction), another mode of operation may be used. For example, when a steering wheel on a transmitter is deflected a distance from center by a user, the mode of operation may be different from the heading mode. For example, the mode of operation may be such that received steering command is passed along to the steering servomotor without any stabilization corrections (i.e., the steering output is strCmd). This mode of operation may be referred to as the rate mode. This mode of operation is illustrated in FIG. 8 by the Rate Regions.

In an example embodiment, the steering wheel position is used to determine the heading and rate regions of FIG. 7. However, a user may desire to trim, or alter slightly, the steering settings of the vehicle. Any steering trim input by the user also trims the Heading Region, thus shifting the steering Heading Region and the Rate Regions.

In an example embodiment, a baseline sensor measurement may be important for the radio 420 to reset the attitude of the vehicle. For example, the microcontroller 410 may connect to a sensor 450 when the microcontroller 110 is powered up to determine a baseline sensor measurement. The baseline sensor measurement may be used as an offset and subtracted from the sensor measurements when the system is running. For example, if the sensor is a yaw rate sensor, the microcontroller 410 may initially connect to the yaw rate sensor to determine an initial yaw rate and then use the initial yaw rate as an offset and subtract that initial yaw rate from the yaw rate measurements when the system is running. Similar baseline measurements and offsets may be determined for roll, pitch, and yaw angles, as well as roll and pitch rates.

In a further aspect, it may be desirable to apply varying gains based on the steering input and the sensor measurement. FIG. 8, for example, illustrates a varying steering priority gain that varies based on a steering input and a sensor measurement (e.g., yaw rate) received from a sensor (e.g., a yaw rate sensor). When the yaw rate has the same sign as the steering command, the steering priority is inversely proportional to the steering input (for example, as shown in Quadrants I and III, steering priority gain equals 100-steering input). In other words, as the steering input is increased, the steering priority gain is decreased such that at full steering input (i.e., a 100% deflection of the steering wheel or a value of 100 for steering input in this example) the steering priority gain equals zero. In this case, the steering input fully controls the steering of the vehicle without any stabilization assistance.

If the signs of the steering input and the sensor measurement rate are different (for example, as shown in Quadrants II and IV), the steering priority is set to full gain, or 100%. As such, the steering intervention is employed. In a further aspect, other sensor measurements besides a yaw rate may be used. Numerous types of steering priority may be used in this embodiment. For example, the steering priority gain may not vary in an inversely proportional manner to the steering input. Instead, the steering priority gain may vary based on step functions, exponential functions, time-weighted averages, or any other function. In a further embodiment, the steering input gain may vary in some manner when the steering input and the sensor measurement are in opposite directions, as illustrated in Quadrants II and IV of FIG. 8. For example, the steering input gain, instead of being at 100%, may be set at a lower level, may vary proportionally, or may vary based on any other function.

Referring to FIG. 7, in a further aspect, a delay is introduced to facilitate holding a steering heading. For example, the microcontroller 410 determines when a user moves the steering control from the center position (such as in the heading region) and when the steering control returns to the center position. In both cases, the steering control movement may produce a brief oscillation, or bounce back, that could negatively affect the stabilization control. To mitigate the possible negative impact of the bounce back upon the return to center position, a delay, for instance a delay of 1 to 8 twenty-two millisecond frames, is used before the attitude is reset as described above.

Figure 9A:
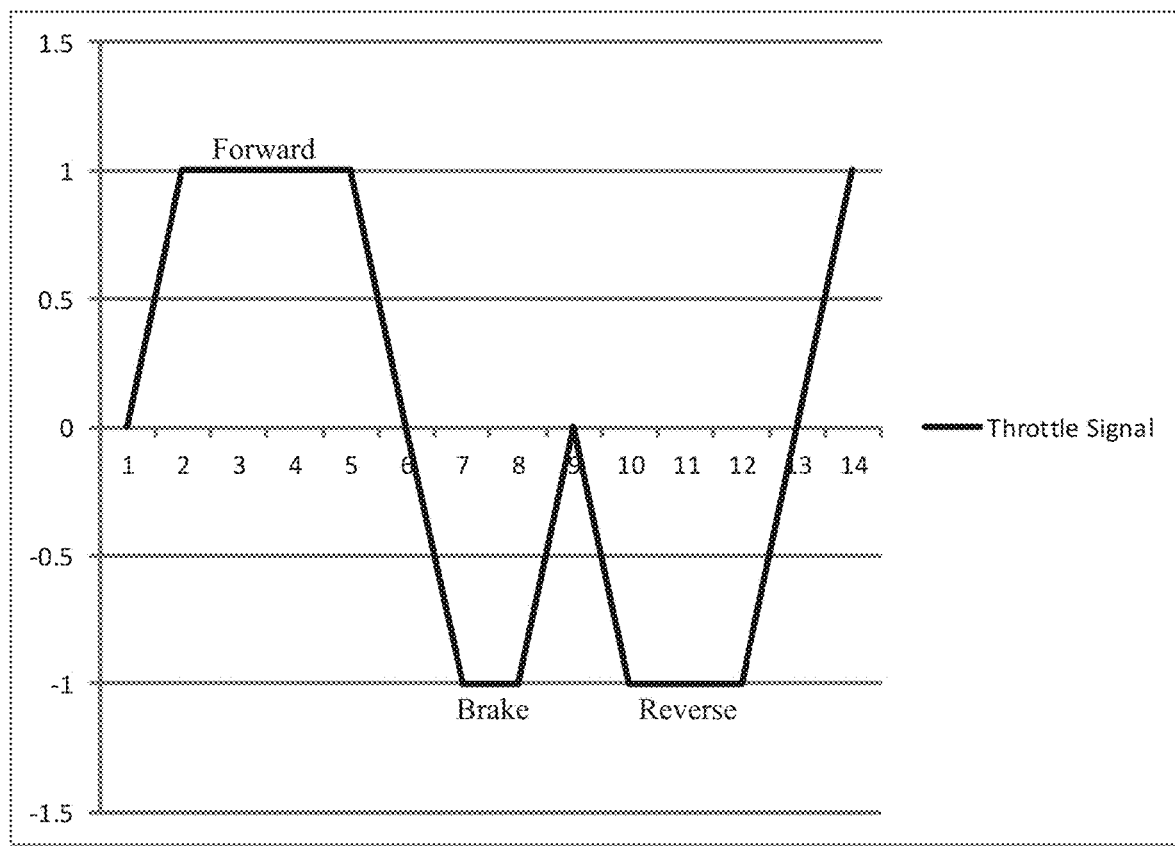
FIG. 9A illustrates the signals received by the microcontroller 410 corresponding to a series of throttle trigger commands, according to an example embodiment.
Figure 9B:
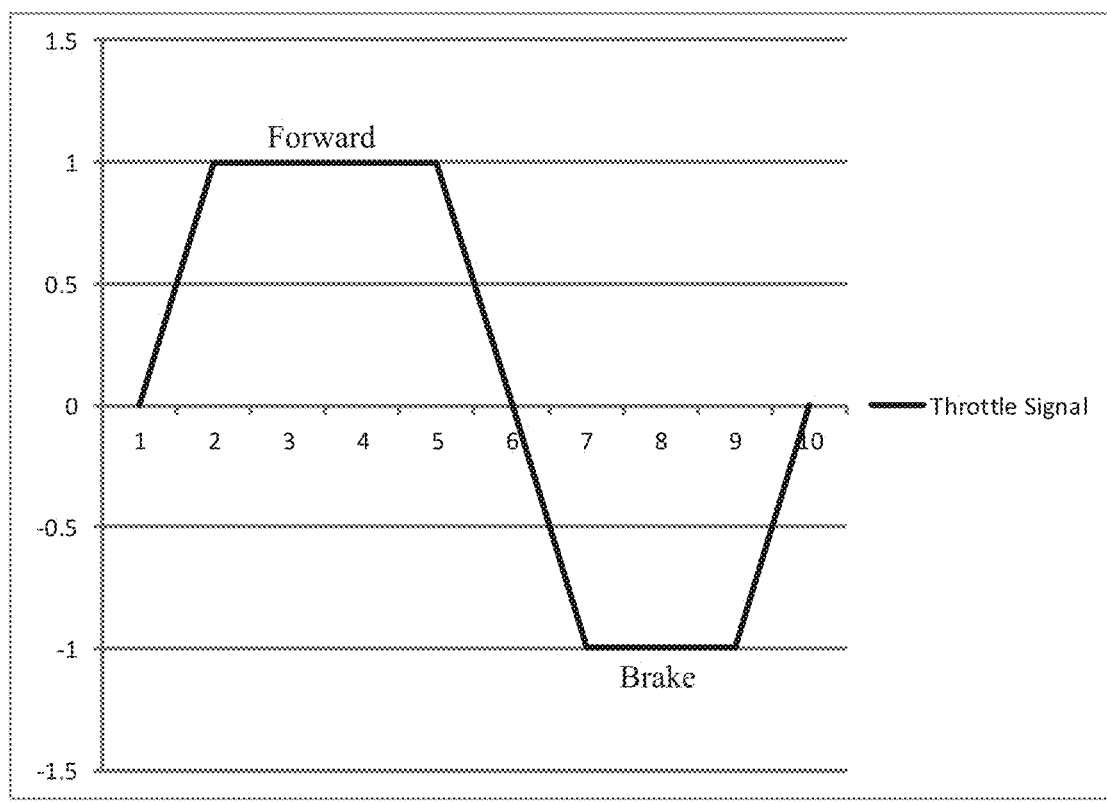
FIG. 9B illustrates the signals received by the microcontroller 410 corresponding to a series of throttle trigger commands, according to an example embodiment.
Figure 9C:
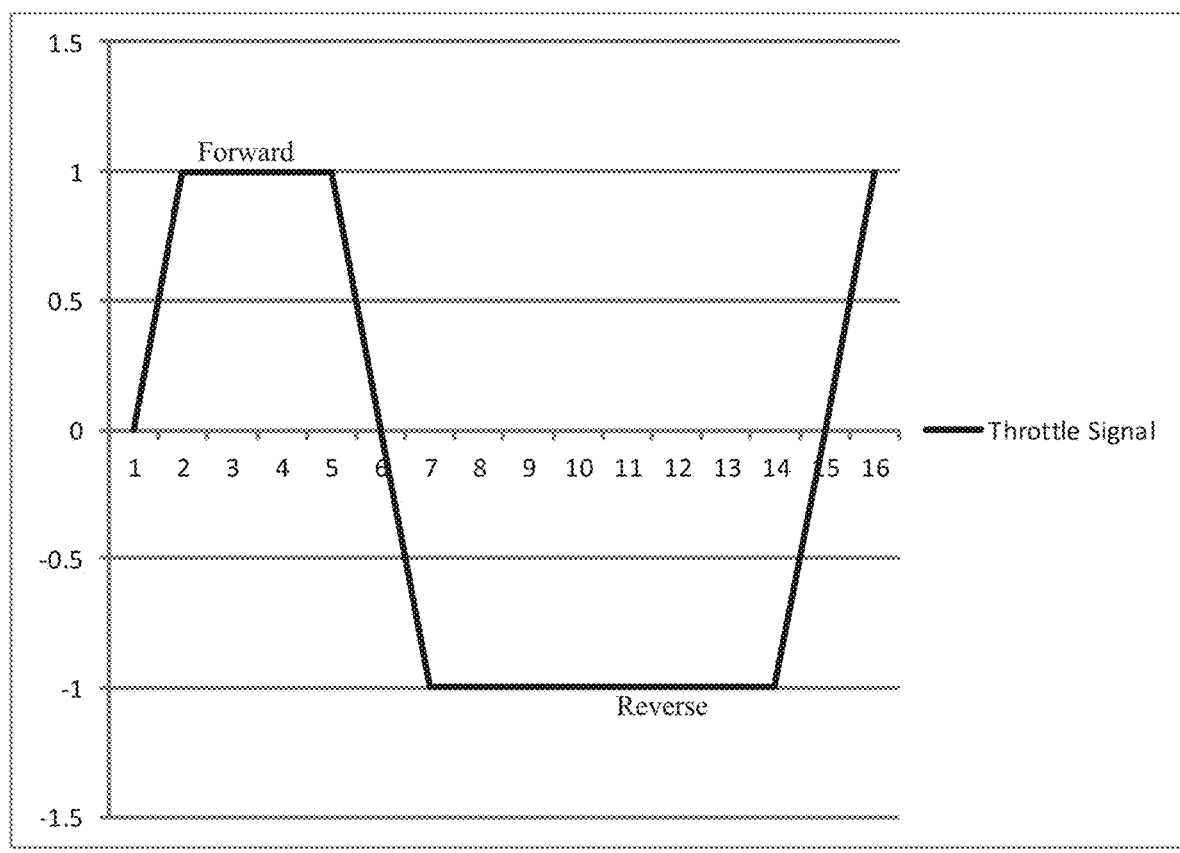
FIG. 9C illustrates the signals received by the microcontroller 410 corresponding to a series of throttle trigger commands, according to an example embodiment.

In some embodiments, the microcontroller 410 is configured to detect when the RC vehicle is going in reverse according to various methods. Reverse detection is important to ensure steering commands are provided in the correct direction (i.e., steering commands for the vehicle moving in reverse may be opposite steering commands given if the RC vehicle is moving forward). FIGS. 9A to 9C illustrate examples of throttle input commands that correspond to when a user pulls or pushes on the throttle of a transmitter. A value of '1' represents a throttle trigger pull of 100% (i.e., the throttle trigger on the transmitter is pulled fully in). A value of '1' represents a throttle trigger push of 100% (i.e., the throttle trigger on the transmitter is pushed fully out). A value of '0' represents a centered throttle trigger. It is undesirable for a motor spinning in one direction to immediately switch to the other direction without slowing down first. As a result, some safeguards are typically used with RC vehicles.

For example (and as described in reference to FIG. 9A), if an RC vehicle is moving forward (throttle pulled in), a user typically does not command the vehicle to reverse with a single push of the trigger. Rather, the first trigger push causes the RC vehicle to brake (and thus slow down the motor), while a second trigger push causes the motor to spin in reverse (and thus the RC vehicle to move in reverse). For example, FIG. 9A illustrates the signals received by the microcontroller 410 corresponding to a series of throttle trigger commands, according to an example embodiment. This series of throttle trigger commands corresponds to a user commanding full throttle by pulling all the way down on the throttle trigger and commanding full reverse throttle by quickly pushing the throttle trigger all the way out, letting the throttle trigger return to center, and again pushing the throttle trigger out and holding it out. The numbers provided are for illustrative purposes only and are not limiting in any way. For example, the microcontroller may detect a forward movement by any throttle signal greater than 0, rather than the full, 100% deflection as illustrated by the '1' along the y-axis in FIG. 10A. Likewise, the microcontroller may detect a braking or reverse movement by any throttle signal less than zero, rather than the full, 100% deflection as illustrated by the '−1' along the y-axis in FIG. 10A.

FIG. 9B illustrates a result of a single throttle pull and then a single throttle push (i.e., a forward command and then a brake command). Note that this example does not include any reverse command. FIG. 9B illustrates the signals received by the microcontroller 410 corresponding to a series of throttle trigger commands, according to an example embodiment. This series of throttle trigger commands corresponds to a user commanding full throttle and then commanding a brake by pushing the throttle trigger all the way out. As described previously, the numbers are for illustratively purposes only.

However, in some instances, a single trigger push held for a period of time may be used to command an RC vehicle to move in reverse. For example, if the RC vehicle is moving forward slowly (e.g., the motor is spinning in a forward direction at lower than a pre-determined safe speed), it may be safe to quickly switch from forward to reverse, as shown in FIG. 9C. FIG. 9C illustrates the signals received by the microcontroller 410 corresponding to a series of throttle trigger commands, according to an example embodiment. This series of throttle trigger commands corresponds to a user commanding full forward throttle by pulling the throttle trigger all the way down and then commanding full reverse throttle by pushing the throttle trigger all the way out and holding the throttle trigger all the way out for a period of time. For example, the period of time may be 2 seconds. Other periods of time may be used as well. As described previously, the numbers are for illustrative purposes only.

In a further aspect, some transmitters have a throttle reverse switch or option, in which the throttle trigger may be pushed for a forward movement and pulled for a reverse/brake movement. Reverse detection for that case is accomplished in a similar manner to that described above but in reverse (i.e. a '1' becomes a '−1' and a '−1' becomes a '1').

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

We claim:

1. A radio-controlled (RC) vehicle comprising:
an inertial measurement unit comprising:
one or more accelerometers configured to output acceleration data associated with acceleration of the RC vehicle;
one or more gyroscopes configured to output rotation data associated with rotation of the RC vehicle; and
a receiver configured to:
receive the acceleration data and the rotation data from the inertial measurement unit;
receive command data from a controller associated with the RC vehicle, wherein the command data includes steering data and throttle data; and
in response to receiving the command data, the acceleration data, and the rotation data, control a wheel direction of at least one wheel of the RC vehicle.

2. The RC vehicle of claim 1, wherein, in response to receiving the command data, the acceleration data, and the rotation data, the receiver is further configured to control a wheel speed of at least one wheel of the RC vehicle.

3. The RC vehicle of claim 1, wherein the receiver is further configured to detect a reverse signal.

4. The RC vehicle of claim 3, wherein the reverse signal is detected based on a comparison of the command data to at least one expected reverse command.

5. The RC vehicle of claim 2, wherein the receiver is further configured to:
determine whether a yaw rate exceeds a yaw rate threshold based on the rotation data; and
in response to determining that the yaw rate exceeds the yaw rate threshold, reduce the wheel speed.

6. The RC vehicle of claim 1, wherein the receiver is further configured to:
determine whether a yaw rate exceeds a yaw rate threshold based on the rotation data; and
in response to determining that the yaw rate exceeds the yaw rate threshold, change the wheel direction.

7. The RC vehicle of claim 1, wherein the receiver controls the wheel direction based at least in part on a steering intervention function.

8. The RC vehicle of claim 7, wherein the steering intervention function is based at least in part on a throttle command, a steering threshold intervention, a steering function, and the steering data.

9. The RC vehicle of claim 2, wherein the receiver controls the wheel speed based at least in part on a throttle intervention function.

10. The RC vehicle of claim 9, wherein the throttle intervention function is based at least in part on a throttle command, a throttle threshold intervention, a throttle threshold intervention delayed, and a throttle proportional intervention.

11. The RC vehicle of claim 1, wherein the receiver is configured to control the wheel direction based at least in part on a varying steering priority.

12. The RC vehicle of claim 11, wherein the steering priority varies based on the steering data and the rotation information.

13. A radio-controlled (RC) vehicle comprising:
an inertial measurement unit comprising:
one or more accelerometers configured to output acceleration data associated with acceleration of the RC vehicle;
one or more gyroscopes configured to output rotation data associated with rotation of the RC vehicle; and
circuitry configured to:
receive the acceleration data and the rotation data from the inertial measurement unit;
receive command data from a controller associated with the RC vehicle, wherein the command data includes steering data and throttle data; and
in response to receiving the steering data, the acceleration data, and the rotation data, control a wheel direction of at least one wheel of the RC vehicle.

14. The RC vehicle of claim 13, wherein, in response to receiving the throttle data, the acceleration data, and the rotation data, the circuitry is further configured to control a wheel speed of at least one wheel of the RC vehicle.

15. The RC vehicle of claim 13, wherein the circuitry is further configured to detect a reverse signal.

16. The RC vehicle of claim 15, wherein the reverse signal is detected based on a comparison of the command data to at least one expected reverse command.

17. An inertial measurement unit for use in a radio-controlled (RC) vehicle, the inertial measurement unit comprising:
one or more accelerometers configured to output acceleration data associated with acceleration of the RC vehicle;
one or more gyroscopes configured to output rotation data associated with rotation of the RC vehicle; and
circuitry configured to:
receive the acceleration data and the rotation data from the inertial measurement unit;
receive command data from a controller associated with the RC vehicle, wherein the command data includes steering data and throttle data; and
in response to receiving the steering data, the acceleration data, and the angular rotation data, control a wheel direction of at least one wheel of the RC vehicle.

18. The inertial measurement unit of claim 17, wherein, in response to receiving the throttle data, the acceleration data, and the rotation data, the circuitry is further configured to control a wheel speed of at least one wheel of the RC vehicle.

19. The inertial measurement unit of claim 17, wherein the circuitry is further configured to detect a reverse signal.

20. The inertial measurement unit of claim 19, wherein the reverse signal is detected based on a comparison of the command data to at least one expected reverse command.

* * * * *